(12) United States Patent
Ali et al.

(10) Patent No.: US 9,481,590 B2
(45) Date of Patent: *Nov. 1, 2016

(54) POLY(ZWITTERION-ALT-SULFUR DIOXIDE) COPOLYMER

(71) Applicant: KING FAHD UNIVERSITY OF PETROLEUM AND MINERALS, Dhahran (SA)

(72) Inventors: Shaikh Asrof Ali, Dhahran (SA); Shamsuddeen Abdullahi Haladu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 393 days.

This patent is subject to a terminal disclaimer.

(21) Appl. No.: 14/091,289

(22) Filed: Nov. 26, 2013

(65) Prior Publication Data

US 2015/0144569 A1    May 28, 2015

(51) Int. Cl.
*H01M 8/10* (2016.01)
*C02F 5/12* (2006.01)
*C02F 103/08* (2006.01)

(52) U.S. Cl.
CPC .............. *C02F 5/12* (2013.01); *C02F 2103/08* (2013.01); *C02F 2303/22* (2013.01)

(58) Field of Classification Search
CPC ...... C08G 75/24; C02F 5/12; C02F 2103/08; C02F 2303/22; H01M 8/10
See application file for complete search history.

(56) References Cited

U.S. PATENT DOCUMENTS 4,671,888 A   6/1987   Yorke
5,116,513 A   5/1992   Koskan et al.

2008/0090972 A1 *  4/2008  Kerres .............. B01D 67/0093
                                                          525/343
2010/0311623 A1   12/2010   Rey et al.
2012/0160438 A1    6/2012   Verrett
2012/0241382 A1    9/2012   Brown et al.

OTHER PUBLICATIONS

Y. Umar et al. / Polymer 46 (2005) 10709-10717.*
Ali, Sk. Asrof et al., "Synthesis and Solution Properties of a New Sulfobetaine/Sulfur Dioxide Copolymer and its Use in Aqueous Two-Phase Polymer Systems," *Polymer*, 44, 1671-1679, 2003.
Ali, Shaikh A. et al., "Cyclopolymerization Protocol for the Synthesis of a Poly(zwitterion-alt-sulfur dioxide) to Investigate the Polyzwitterion-to-Poly(anion-zwitterion) Transition," *Journal of Applied Polymer Science*, Dec. 10, 2012, 11 pages.
Mazumder, Mohammad A.J. et al., "Synthesis and Solution Properties of a New Poly(electrolyte-zwitterion)," *Polymer*, 45(1), 125-132, 2004.

* cited by examiner

*Primary Examiner* — Shane Fang
(74) *Attorney, Agent, or Firm* — Richard C. Litman

(57) ABSTRACT

The poly(zwitterion-alt-sulfur dioxide) copolymer includes a structural unit having the structural formula:

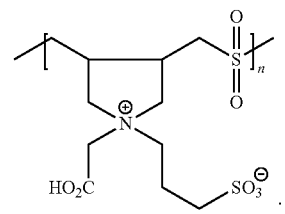

wherein "n" is the number of repeating units. The copolymer is made by cocyclopolymerizing 3-(N,N-diallyl,N-carboethoxymethylammonio)propanesulfonate with sulfur dioxide to obtain an intermediate polyzwitterion (PZ) copolymer, which is hydrolyzed to form the copolymer. The copolymer may be converted to a poly(electrolyte-zwitterion) by treatment with a base, such as sodium hydroxide.

3 Claims, 10 Drawing Sheets

Fig. 1

8: Water-soluble
PRIOR ART
Fig. 2A

9: Water-insoluble
PRIOR ART
Fig. 2B

10: Water-soluble

PRIOR ART

*Fig. 2C*

11: Water-insoluble
CSC (NaCl): 0.069 M

PRIOR ART

*Fig. 2D*

12: Water-insoluble
CSC (NaCl): 0.67 M

PRIOR ART

*Fig. 2E*

13: Water-insoluble
CSC (NaCl): 1.5 M

PRIOR ART

*Fig. 2F*

14: Water-insoluble

PRIOR ART

*Fig. 2G*

15: Water-soluble

PRIOR ART

PRIOR ART

PRIOR ART

PRIOR ART

*Fig. 3C*

PRIOR ART

POLY(ZWITTERION-ALT-SULFUR DIOXIDE) COPOLYMER

BACKGROUND OF THE INVENTION

1. Field of the Invention

The present invention relates to antiscalants for reverse osmosis plants, and particularly to a poly(zwitterion-alt-sulfur dioxide) copolymer formed from 3-(N,N-diallyl,N-carboethoxymethylammonio)propanesulfonate cocyclopolymerized with sulfur dioxide that may be used as an inhibitor of scale, such as $CaSO_4$.

2. Description of the Related Art

Reverse osmosis (RO) is a water purification technology that uses a semipermeable membrane. This membrane-technology is not properly a filtration method. In RO, an applied pressure is used to overcome osmotic pressure, a colligative property, that is driven by chemical potential, a thermodynamic parameter. RO can remove many types of molecules and ions from solutions and is used in both industrial processes and in producing potable water. The result is that the solute is retained on the pressurized side of the membrane, and the pure solvent is allowed to pass to the other side. To be selective, this membrane should not allow large molecules or ions through the pores (holes), but should allow smaller components of the solution (such as the solvent) to pass freely. RO is commonly used in desalination plants. In the reverse osmosis desalination process, the feed water splits into product water and reject brine streams. The dissolved salts in the feed water are concentrated in the reject brine stream. If supersaturation occurs and solubility limits are exceeded, precipitation or scaling will occur.

The deposits commonly encountered in the desalination process include mineral scales (e.g., $CaCO_3$, $CaSO_4$ and $Mg(OH)_2$), corrosion products, polymeric silica, and suspended matter. The specific mechanism of inhibition of scaling is sequestration, or the capability of forming stable complexes with polyvalent cations. The antiscalant-treated solutions are stabilized via alteration in crystal morphology at the time of nucleation and subsequent inhibition in growth rate. Commonly used antiscalants are derived from three chemical families: condensed poly(phosphate)s, organophosphates, and polyelectrolytes. The anionic form of the antiscalants helps prevent scale formation by sequestering the cations.

Polyzwitterions have a high dipole moment due to the electrostatic dipole-dipole attractions within and between molecules of the compounds. A polyzwitterion (PZ) polyelectrolyte forming a polar host matrix in which only target ions can migrate would potentially be useful as an antiscalant. Present antiscalants typically have a relatively high phosphorous content, which is damaging to the environment. It would be desirable to produce an effective antiscalant with a low phosphorous content.

Thus, a poly(zwitterion-alt-sulfur dioxide) copolymer solving the aforementioned problems is desired.

SUMMARY OF THE INVENTION

The poly(zwitterion-alt-sulfur dioxide) copolymer includes a structural unit having the structural formula:

The method for synthesizing the poly(zwitterion-alt-sulfur dioxide) copolymer is also provided. The method includes cocyclopolymerizing 3-(N,N-diallyl,N-carboethoxymethylammonio) propanesulfonate with sulfur dioxide to obtain an intermediate polyzwitterion (PZ) copolymer, the intermediate polyzwitterion (PZ) copolymer including an ester group; and performing acidic hydrolysis on the intermediate polyzwitterion (PZ) copolymer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The poly(zwitterion-alt-sulfur dioxide) copolymer includes a structural unit having the structural formula:

in the acid form The number of repeating units "n" may be greater than 10. For example, n may be 15-200. The poly(zwitterion-alt-sulfur dioxide) copolymer exhibits antiscaling properties and is effective in inhibiting the formation of calcium sulfate scale. As such, the poly(zwitterion-alt-sulfur dioxide) copolymer, in either the acid form or as a salt, may be suitable for use as an antiscalant in a reverse osmosis plant, for example.

Figure 1:
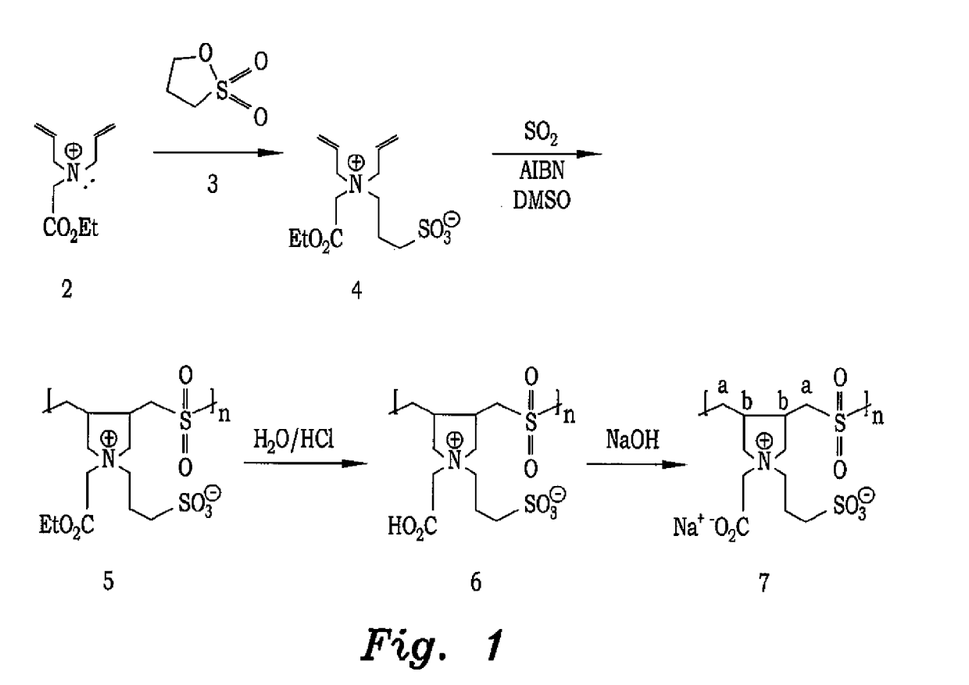
FIG. 1 is a reaction scheme for the synthesis of a poly(zwitterion-alt-sulfur dioxide) copolymer according to the present invention.
Figure 2A:
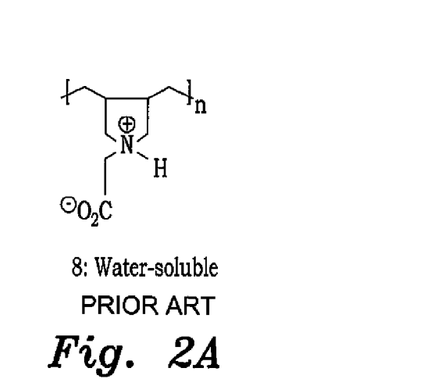
FIG. 2A is the formula for a water-soluble polycarbobetaine according to the prior art.
Figure 2B:
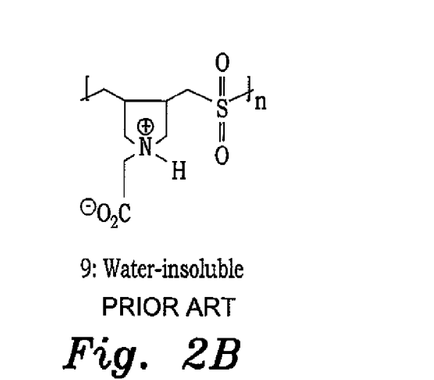
FIG. 2B is the formula for the polycarbobetaine of FIG. 2A copolymerized with sulfur dioxide according to the prior art, the copolymer being water-insoluble.
Figure 2C:
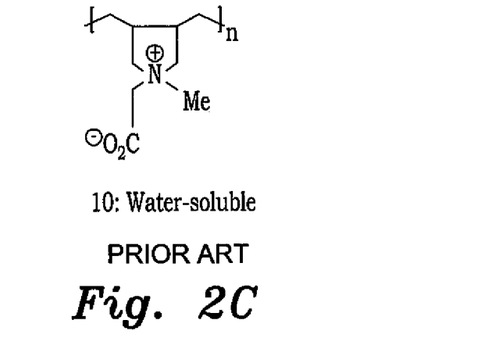
FIG. 2C is the formula for another water-soluble polycarbobetaine according to the prior art.
Figure 2D:
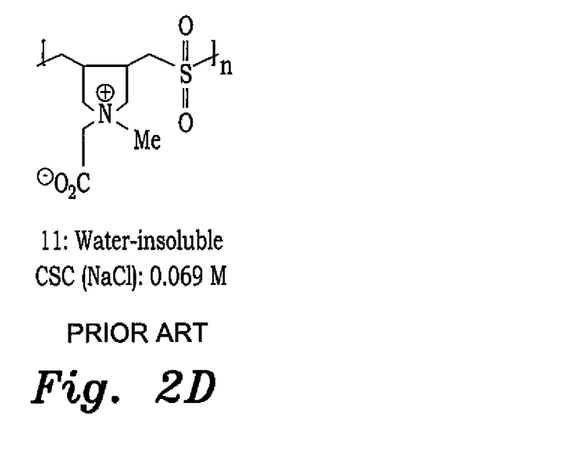
FIG. 2D is the formula for the polycarbobetaine of FIG. 2C copolymerized with sulfur dioxide according to the prior art, the copolymer being water-insoluble.
Figure 2E:
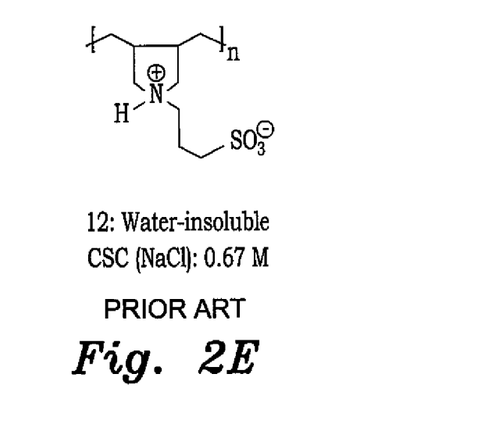
FIG. 2E is the formula for a water-insoluble polysulfobetaine according to the prior art.
Figure 2F:
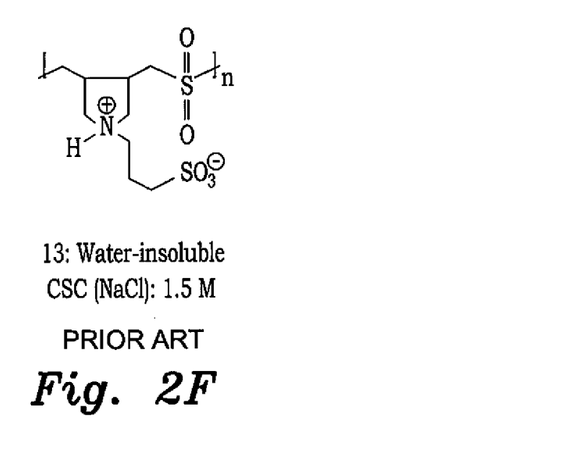
FIG. 2F is the formula for the polysulfobetaine of FIG. 2E copolymerized with sulfur dioxide according to the prior art, the copolymer being water-insoluble.
Figure 2G:
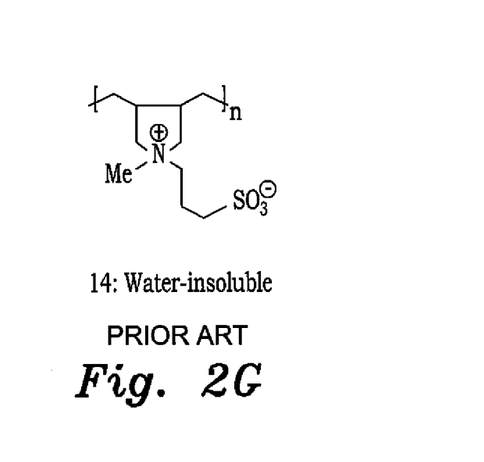
FIG. 2G is the formula for another water-insoluble polysulfobetaine according to the prior art.
Figure 2H:
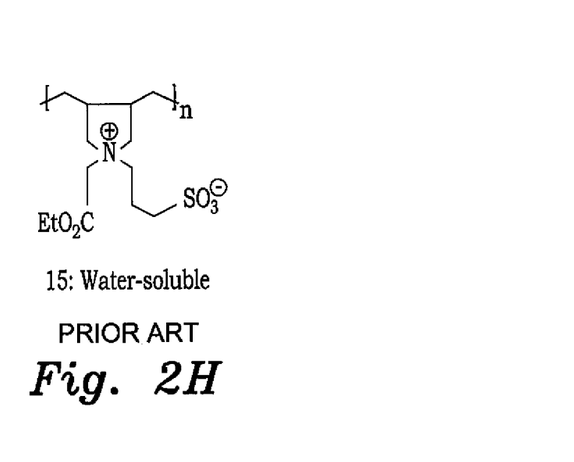
FIG. 2H is the formula for another water-insoluble polysulfobetaine according to the prior art.

As shown in FIG. 1, synthesis of the poly(zwitterion-alt-sulfur dioxide) copolymer may require the synthesis of intermediate polyzwitterion (PZ) copolymer 5, also referred to herein as 5 or PZ 5. PZ 5 is obtained by cocyclopolymerization of the zwitterionic monomer, 3-(N,N-diallyl,N-carboethoxymethylammonio)propanesulfonate with sulfur dioxide in DMSO, using azoisobutyronitrile as the initiator. Acidic hydrolysis of the ester groups of PZ 5 yields the poly(zwitterion-alt-sulfur dioxide) copolymer 6. PZA 6 is, in effect, a corresponding acid of PZ 5. Treatment of PZA 6 with sodium hydroxide yields a poly(electrolyte-zwitterion) (PEZ), also referred to herein as 7 or PEZ 7. PEZ 7 is, in effect, a corresponding salt or electrolyte of PZA 6.

Polybetaines, for example polyzwitterions, may be insoluble in salt-free water, but a considerable number of polycarbobetaines (PCBs) and polysulfobetaines (PSBs) may be water-soluble. A number of typical PCBs (8, 10) and PSBs (12, 14, 15) as well as their copolymers with SO$_2$ (9, 11, 13) are shown FIGS. 2A-2H. The PCBs 8 and 10, having carboxyl pK$_a$ of >2, are water-soluble, while the corresponding SO$_2$-copolymers 9 and 11 are reported to be insoluble in water. Among the PSBs (12-15), PSB 12 is reported to be insoluble in water, while PSB 15 is water-soluble. The difference in the solubility behavior between 14 and 15 has been rationalized in terms of steric factors. More crowded surroundings around the charges in 15, owing to the presence of the bulkier CH$_2$CO$_2$Et group (vs. Me group 14), do not encourage effective intra- or intermolecular Coulombic interactions. The reported solubility data, thus, reveals that the presence of SO$_2$ and SO$_3^-$ leads to stronger zwitterionic interactions and insolubility.

Simulation results have shown that the negative charges in carboxybetaines interact with water molecules stronger than the sulfobetaines. The respective carboxyl and sulfonyl pK$_a$ values of >2 and −2.1, imply that the negative charges on the carboxyl moiety are expected to be less dispersed, hence more hydrated, and as such, tend to exhibit weaker Coulombic interactions with the cationic charges on nitrogens, thus imparting solubility in salt-free water. The sulfobetaine moiety, on the other hand, having more dispersed charges and thus being less hydrated, is able to exert stronger zwitterionic interactions. While a NaCl concentration of 0.67M is required to shield the zwitterionic interactions and induce solubility of sulfobetaine 12, a much higher concentration of 1.5M NaCl is required to disrupt zwitterionic interactions and promote solubility of PSB 13, having SO$_2$ moieties on the polymer backbone. The influence of SO$_2$ units is manifested by the difference of two orders of magnitude in the pK$_a$ values of PSBs 12 and 13. The presence of electron-withdrawing SO$_2$ units may disperse the positive charges on nitrogens, thus making them less hydrated, thereby augmenting the Coulombic interactions with the sulfonate groups. The dipole moment of the sulfobetaine moiety (in triethylammoniopropanesulfonate) and the carbobetaine (in alanine) has been reported to be 23.0 D and 15.9 D, respectively. The chain collapse may be attributed to the greater dipole-dipole intramolecular interactions between the sulfobetaine moieties.

PZ 5 is insoluble in salt-free water, while the corresponding homopolymer 15 is water-soluble. The presence of SO$_2$ is responsible for stronger zwitterionic interactions in PZ 5. PZ 5 is soluble in aqueous solutions of HCl and in the presence of a variety of salts, including divalent Ca$^{2+}$, which is known to precipitate polyelectrolytes.

PZA 6 is insoluble in salt-free water and soluble in the presence of a salt. PZA 6 is pH responsive. Evaluation of antiscaling properties revealed that PZA 6 at a meager concentration of 10 ppm is very effective in inhibiting the formation of calcium sulfate scale, and as such, may be used effectively as an antiscalant additive in a reverse osmosis plant.

PEZ 7 is water-soluble. PEZ 7 possesses zwitterionic and anionic motifs in the same repeating unit. PEZ 7 is the first synthetic example of a poly{(electrolyte-zwitterion)-alt-SO$_2$}, having carboxylate and sulfonate pendants. The presence of SO$_2$ in the polymer backbone may have a profound effect on the solution properties of the polymer. The presence of $SO_2$ in the polymer backbone may provide backbone stiffening.

Figure 3A:
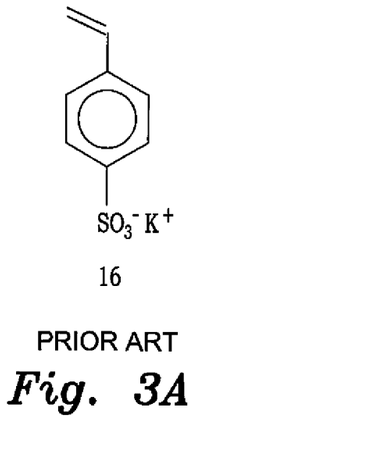
FIG. 3A is the formula for a sulfonate of the prior art.
Figure 3B:
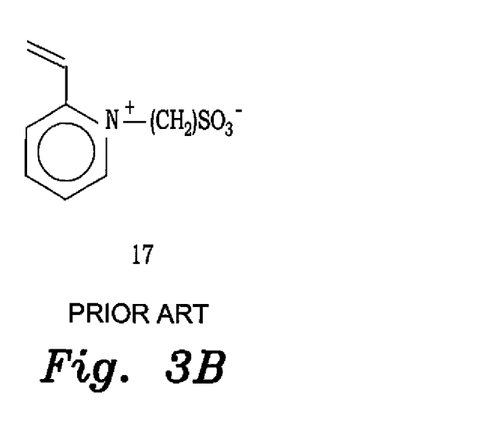
FIG. 3B is the formula for a monomer that forms an alternating anionic-zwitterionic copolymer of the prior art upon reaction with the sulfonate of FIG. 3A.

PEZ 7 may possess features common to both conventional anionic polyelectrolytes and polyzwitterions. For example, the solution behavior of PEZ 7 may be similar to a typical alternating anionic-zwitterionic polymer. For example, the aqueous solution behavior of PEZ 7 is similar to that observed for a typical alternating anionic-zwitterionic copolymer derived from monomers 16 and 17, shown in FIG. 3A and FIG. 3B, respectively. Two types of (electrolyte-zwitterion)/$SO_2$ copolymers have been previously described. In both cases the anionic motifs in the first monomer, i.e., the electrolyte-zwitterion monomer, were either sulfonate or carboxylate. In contrast, PEZ 7, obtained via the cyclopolymerization protocol, includes different anionic motifs (carboxylate and sulfonate) in the same repeating unit, as well as an $SO_2$ spacer in the polymer backbone. PEZ 7 may therefore be described as an alternating anionic-zwitterionic polymer, as depicted schematically in FIG. 3C.

When zwitterionic monomer 4 undergoes cocyclopolymerization with $SO_2$ in the presence of initiator AIBN, PZ 5 may be obtained in excellent yields. The results of the polymerization under various conditions are given in Table I, shown below.

TABLE 1

Copolymerization of Monomer 4 with Sulfur Dioxide

| Entry No. | Monomer (mmol) | DMSO (g) | Initiator[a] (mg) | Yield (%) | $[\eta]^b$ (dL $g^{-1}$) | $\overline{M}_w$ | (PDI)[d] |
|---|---|---|---|---|---|---|---|
| 1 | 10 | 2.3 | 30 | 82 | 0.164 | — | — |
| 2 | 10 | 3.6 | 30 | 95 | 0.186 | — | — |
| 3 | 10 | 5.8 | 30 | 85 | 0.140 | $1.01 \times 10^5$ | 2.34 |
| 4 | 20 | 5.8 | 60 | 90 | 0.188 | $1.33 \times 10^5$ | 2.47 |

Polymerization reactions were carried out in DMSO using equimolar mixture of monomer 4 and $SO_2$ at 60° C. for 24 h.
[a]Azobisisobutyronitrile.
[b]Viscosity of 1-0.25% polymer solution in 0.5N NaCl at 30° C. was measured with Ubbelohde Viscosometer (K = 0.005718).

As is evident from Table 1, changing the amount of solvent (DMSO) does not have any appreciable effect on the yield or intrinsic viscosity [η] of PZ 5. (±) PZ 5 upon hydrolysis in 6 M HCl afforded (±) PZA 6, which, on treatment with an equivalent amount of NaOH, produced (−±) PEZ 7, so-named for possessing both anionic electrolyte as well as zwitterionic motifs in the same repeating unit. PZ 5, PZA 6, and PEZ 7 were observed to be stable up to around 260° C.

The IR spectrum of PZ 5, PZA 6, and PEZ 7 indicates the presence of a sulfonate group by its strong characteristic bands at ~1200 cm$^{-1}$ and ~1040 cm$^{-1}$. The two strong bands at ~1300 cm$^{-1}$ and ~1130 cm$^{-1}$ were assigned to the asymmetric and symmetric vibrations of the $SO_2$ unit. Absorption at ~1740 cm$^{-1}$ was attributed to the C=O stretch of COOEt and COOH of 5 and 6. The symmetric and anti-symmetric stretching of COO$^-$ in 7 appeared at 1405 cm$^{-1}$ and 1628 cm$^{-1}$, respectively.

The $^1$H and $^{13}$C NMR spectra of monomer 4 and PZ 5, PZA 6, and PEZ 7 are shown in FIGS. 4A-4D and 5A-5D, respectively. The alkene and carbonyl carbons of 4 and 5 are shown in the insets of FIGS. 5A-5D. The carbonyl carbon of 6 and 7 appeared at 167.68 and 169.58, respectively (not shown). The absence of any residual alkene proton or carbon signal in the spectra of 5-7 indicated the chain transfer process for the termination reaction involved the macroradical abstracting the labile allylic hydrogen of the monomer.

The absence of the signals for the methyl protons and carbon of OCH$_2$CH$_3$ at ~δ1.4 (FIG. 4C) and δ14.5 (FIG. 5C), respectively, ascertained the complete hydrolysis of the ester functionality in 5, giving 6. Integration of the relevant peaks in the $^{13}$C NMR spectrum yielded a 75/25 cis-trans ratio of the ring substituents at C$_{b,b}$ (Scheme 1), and is similar to that observed for polymers derived from quaternary ammonium salts.

Referring to Table 2, below, it can be seen that all three polymers (5-7) are insoluble in a majority of the protic as well as nonprotic solvents of very high dielectric constants (ε).

TABLE 2

Solubility[a,b] of PZ 5, PZA 6, and PEZ 7

| Solvent | ε | PZ 5 | PZA 6 | PZA 7 |
|---|---|---|---|---|
| Formamide | 111 | + | ± | + |
| Water | 78.4 | − | − | + |
| Formic acid | 58.5 | + | − | − |
| DMSO | 47.0 | − | − | − |
| Ethylene glycol | 37.3 | − | − | − |
| DMF | 37.0 | − | − | − |
| Methanol | 32.3 | − | − | − |
| Triethylene glycol | 23.7 | − | − | − |
| Acetic acid | 6.15 | − | − | − |

[a]2% (w/w) of polymer-water mixture (solution) was made after heating the mixture at 70° C. for 1 h and then cooling to 23° C.
[b]'+' indicates soluble, '−' indicates insoluble, and '±' indicates partially soluble.

The polymers (5-7) may be soluble or partially soluble in formamide having a very high dielectric constant of 111. Polymers (±) 5 and (±) 6 are insoluble in salt-free water, as expected of polyzwitterions, while the anionic/zwitterionic polymer (−±) 7 is water-soluble, thereby confirming its electrolytic nature.

The minimum salt concentrations (CSCs) of various salts required to promote water solubility of PZ 5 at 23° C. are shown below in Table 3.

TABLE 3

Minimum Salt Concentration for Aqueous Solubility of PZ 5 at 23° C.

| Salt | CSC (M) |
|---|---|
| LiCl | 0.32 |
| NaCl | 0.29 |
| KCl | 0.31 |
| KBr | 0.047 |
| KI | 0.0060 |
| NH$_4$Cl | 0.32 |
| CaCl$_2$ | 0.25 |
| HCl | 0.38 |

For a common anion, Cl$^-$, the cations do not show any appreciable effect on solubility. The fairly large hydration shell means that the cations, due to their large charge/radius ratio, cannot approach close enough to neutralize the highly dispersed charge on the sulfonate group. The anions, on the other hand, are known to play a more dominant role in deciding solubility behavior by effectively shielding the cationic charges on the nitrogens. For a common cation, K$^+$, the sequence of increasing solubilizing power was found to be Cl$^-$<Br$^-$<<I$^-$ The concentration of KCl required to promote water solubility was found to be 6.6 and 52 times more than that of KBr and KI, respectively. The increased solubilizing power of KI is attributed to the most polarizable (soft) iodide anion's ability to effectively neutralize the ionic crosslinks. It should be understood that the CSC (NaCl)

required for promoting solubility of PZ 5 and 13 were found to be 0.29 and 1.5 M, respectively. The considerable difference may be attributed to the less crowded cationic charges in the latter.

Figure 3C:
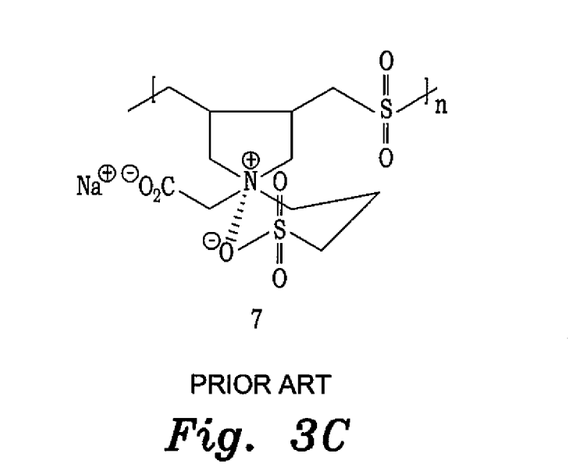
FIG. 3C is the formula for the poly(zwitterion-alt-sulfur dioxide) copolymer according to the present invention, showing a conformation making the alternating anionic-zwitterionic structure clearer.
Figure 3D:
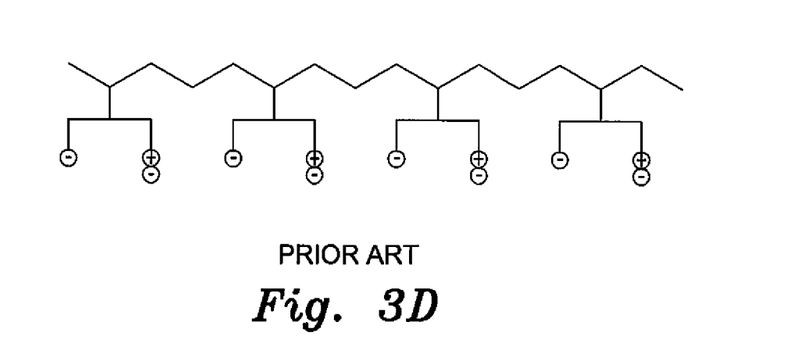
FIG. 3D is the formula of a straight chain hydrocarbon having an alternating anionic-zwitterionic structure.

PZA 6 is insoluble in salt-free water. A 1 wt % mixture remained insoluble at 23° C., even after stirring overnight. However, it was soluble while stirring in the presence of 0.025 N NaCl. It should be understood that the CSC of PZA 6 cannot be determined, since dilution of its solution in 0.025 N NaCl with salt-free water did not produce any turbidity, while the turbidity returned by adding a few drops of 6 M HCl. The interesting solubility behavior of PZA 6 may be attributed to the presence of a zwitterionic moiety and the undissociated $CO_2H$ in the solid state. Once the polymer is dissolved in the presence of the added salt (NaCl), dissociation of the carboxyl groups introduces the anionic motifs and keeps it in the solution state as the ($\pm$) PZA 6 moves towards ($-\pm$) PEZ 7 (i.e. [( ... $N^\pm$ ... $CO_2H$ (6)$\leftrightarrows$ ... $N^\pm$ ... $CO_2^-$ (7)+$H^+$]). Dilution with salt-free water further increases the $CO_2H$ dissociation and solubility. The addition of HCl, however, shifts the equilibrium from soluble ($-\pm$) PEZ 7 towards insoluble ($\pm$) PZA 6. The sulfonyl moiety in PEZ 7 is involved in zwitterionic interactions as depicted in FIG. 3C, leaving out the carboxyl moiety to impart anionic character and solubility.

Figure 6:
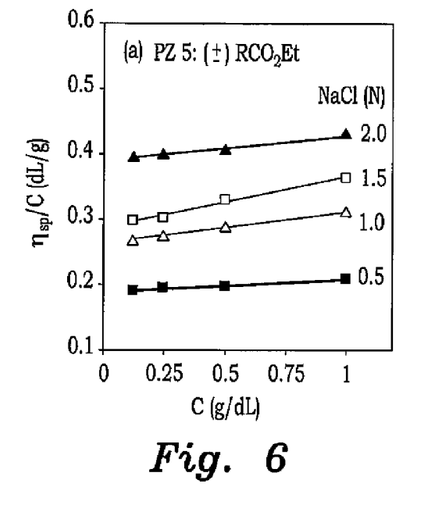
FIG. 6 is a graph showing the variation of viscosity using an Ubbelohde Viscometer at 30° C. of compound 5 of the reaction scheme of FIG. 1.
Figure 7:
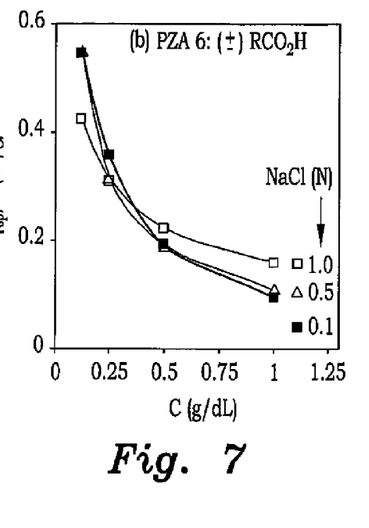
FIG. 7 is a graph showing the variation of viscosity using an Ubbelohde Viscometer at 30° C. of compound 6 of the reaction scheme of FIG. 1.

Viscosity data for the polymers 5-7, having almost identical degree of polymerization, were evaluated by the Huggins equation: $\eta_{sp}/C=[\eta]+k\,[\eta]^2\,C$. The dependency of the viscosity of ($\pm$) PZ 5, ($\pm$) PZA 6 and ($-\pm$) PZA 7 in aqueous solution as a function of various concentrations of NaCl are shown in FIGS. 6-9. An increase in the intrinsic viscosity with increasing NaCl concentration explains the antipolyelectrolyte behavior of PZ 5 (FIG. 6). The increasing dissociation of the $CO_2H$ groups in ($\pm$) PZA 6 with dilution keeps the viscosity curve concave upwards (FIG. 7). Based on the carboxyl $pK_a$ value of 2.98 in 0.1 N NaCl, its percent dissociation in 1, 0.5, 0.25 and 0.125 g/dL solutions has been calculated to be 17, 23, 31 and 41, respectively. Therefore, increasing introduction of $CO_2^-$ anionic motifs would expand the polymer backbone, and hence increase the viscosity values with dilution.

It should be understood that the viscosity values of ($\pm$) PZA 6 remain almost similar with further increase in the salt concentration to 0.5 N and 1 N NaCl (FIG. 7). The carboxyl $pK_a$ in PZA 6 was determined to be 3.42 and 2.98 in salt-free and 0.1 N NaCl, respectively. The percent dissociation of $CO_2H$ groups is, thus, expected to increase with the increase in the ionic strength of the medium. The near constancy of the viscosity values with the salt concentrations may be attributed to the opposite effect of increasing dissociation to $CO_2^-$ and increased shielding of the charges on the viscosity values. While the dissociation increases the viscosity, shielding decreases it.

Figure 8:
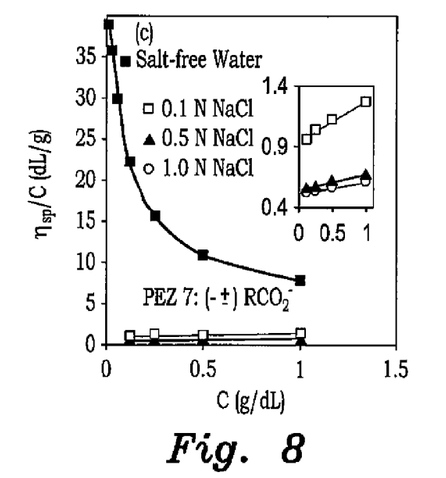
FIG. 8 is a graph showing the variation of viscosity using an Ubbelohde Viscometer at 30° C. of compound 7 of the reaction scheme of FIG. 1.

FIG. 8 displays the viscosity behavior of PEZ ($-\pm$) 7 in salt-free water and various concentrations of NaCl. In salt-free water, the viscosity plot is typical of a polyelectrolyte, i.e., concave upwards. The presence of an extra negative charge per repeating unit in anionic-zwitterionic ($-\pm$) PEZ 7 makes its viscosity behavior typical of an anionic polyelectrolyte. The viscosity behavior of PZ 5, PZA 6 and PEZ 7 having identical degrees of polymerization in 1.0 N NaCl are compared in FIG. 9. Polymer ($-\pm$) 7, having completely dissociated $CO_2^-$ anions, has higher viscosity values than that of ($\pm$) 6, having partially dissociated $CO_2H$ groups. It should be understood that under extreme dilution, the viscosity values of both the polymers are expected to be identical.

Figure 10:
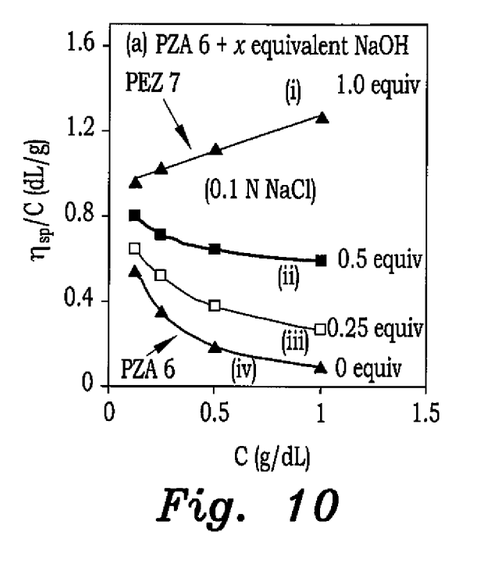
FIG. 10 is a graph showing the variation of viscosity using an Ubbelohde Viscometer at 30° C. for compound 6 of the reaction scheme of FIG. 1 in the presence of base (NaOH).

The dependency of viscosity of PEZ ($-\pm$) 6 in aqueous solution containing various concentration of NaOH in 0.1 N NaCl is shown in FIG. 10. The viscosity increases with increasing amounts of NaOH, which gradually transforms ($\pm$) PEZ 6 to ($-\pm$) PEZ 7.

Figure 11:
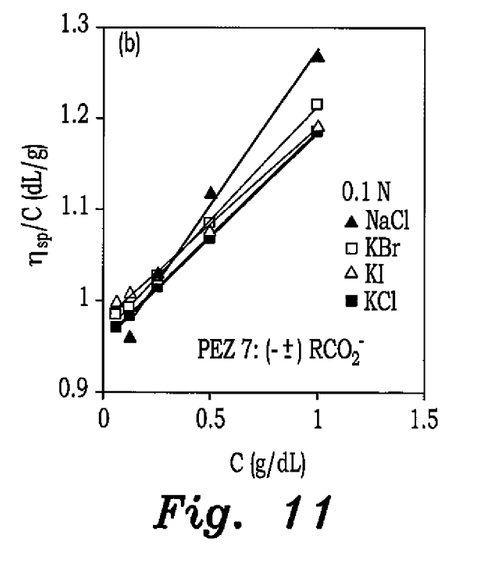
FIG. 11 is a graph showing the variation of viscosity using an Ubbelohde Viscometer at 30° C. of compound 7 of the reaction scheme of FIG. 1 with various 0.1 N Salts.

FIG. 11 shows that the intrinsic viscosity [$\eta$] of ($-\pm$) PEZ 7 in 0.1 N NaCl, KCl, KBr, KI at 30° C. was determined to be 0.935, 0.956, 0.965, and 0.980 dL/g, respectively. It is known that the intrinsic viscosity of polybetaines or polyampholytes in 0.1 N aqueous salt solution decreases in the order KI>KBr>KCl. However, the presence of salt has an equal and opposite influence on the anionic ($-$) and zwitterionic ($\pm$) motifs. It helps the anionic portion to coil up, and the zwitterionic part to expand. The viscosity of anionic polyelectrolytes is mostly independent of the effect of anions (like $Cl^-$, $Br^-$, etc.). While it was expected that the more polarizable (soft) iodide anion would effectively neutralize the cationic charges, and thereby force the expansion of the macromolecule to minimize repulsion among the more exposed negatives charges $CO_2^-$ and SO, this was not the case. The salt effect on intrinsic viscosity was minimal as a result of shielding of the anionic motifs, as well as being in a sea of cations (FIG. 11).

The solution behavior of polyampholytes with or without charge symmetry has previously been described mathematically in terms of:

$$v^* = -\frac{\pi(fI_B)^2}{\kappa_S} + \frac{4\pi I_B \Delta f^2}{\kappa_S^2} \quad (1)$$

where $v^*$ is the electrostatic excluded volume, $I_B$ is the Bjerrum length, f is the total fraction of charged monomers, $\Delta f$ is the charge imbalance, and $\kappa_S$ is the Debye-Huckel screening parameter. The screening of the attractive polyampholytic and Coulombic repulsive interactions are described by the first and second term of equation (1), respectively. Solution behavior of the electroneutral ($\pm$) PZ 5 must then be described by the screening of the attractive polyampholytic interactions only, since the second term of equation (1) becomes zero as a result of $\Delta f=0$. The negative electrostatic excluded volume indicates contraction to a collapsed polymer chain. In the presence of added salt NaCl, the electroneutrality of ($\pm$) PZ 5 cannot be maintained, since the cationic nitrogens are more effectively screened by $Cl^-$ ions, while $Na^+$, with its larger hydration shell, cannot shield the $SO_3^-$ to the same extent. As a result, PZ 5 will acquire an overall anionic charge, thus helping expansion of the polymer coil by making $v^*$ less negative than in the absence of NaCl.

For ($\pm$) PZA 6 and ($-\pm$) PEZ 7, $\Delta f \neq 0$, so that the charge imbalance is maximum for the PEZ ($\Delta f=0.33$), while it depends on the extent of dissociation in the case of the PZA. Since the percent dissociation of $CO_2H$ (i.e. $RCO_2H \leftrightarrows RCO_2^- + H^+$) in 0.1 N NaCl for 1, 0.5, 0.25 and 0.125 g/dL solutions of PZA 6 has been determined to be 17, 23, 31 and 41, respectively, the corresponding $\Delta f$ values are calculated as 0.078, 0.10, 0.13, and 0.17. The increasing importance of the second term in equation (1) with decreasing polymer concentration leads to the expansion of the polymer coil. This correlates directly with the viscosity data in FIG. 7, i.e., the increase of viscosity values with the decrease in polymer concentration. The polymer has a higher ampholytic character at a concentration of 1 g/dL than at 0.125 g/dL. Indeed, this is corroborated by experimental observation. A closer look at FIG. 7 reveals that the viscosity value increases with the increase in NaCl concentration at the higher end of the polymer concentration (i.e., 1 g/dL), while it decreases at the lower end (i.e., 0.125 g/dL). At the higher end, there is an overall expansion. The expansion due to screening of the ampholytic motifs is greater that the contraction, due to screening of the anionic motifs.

Figure 9:
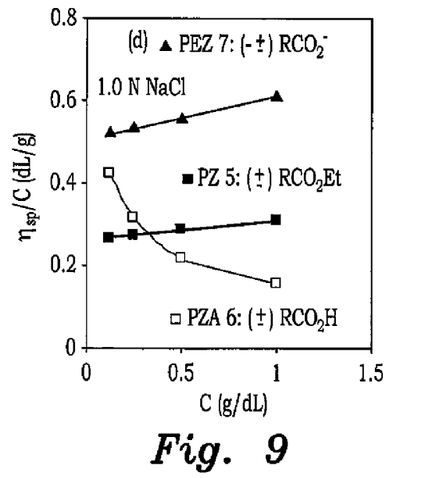
FIG. 9 is a graph showing the viscosity behavior of compounds 5, 6, and 7 in 1.0 N NaCl.

At the higher concentrations of salt (0.5 N or more), the viscosity values of (−±) PEZ 7 remain constant as a result of the near completion of screening of both the ampholytic and anionic motifs (FIG. 9, inset). The electrostatic contribution to the polymer size becomes insignificant as a result of minimized importance of both terms in equation (1) as a result of complete shielding of all electrostatic effects.

Table 4, below, shows experimental details for the protonation of PZA 6 at 23° C. in salt-free water and 0.1 N NaCl.

may be described by the viscometric transformation in 0.1 N NaCl, shown in FIG. 10. Even though the corresponding transformation of (−±) PEZ 7 from salt-free water (FIG. 8) to (±) PZA 6 in salt-free-water cannot be achieved, owing to the insolubility of the latter, it can be assumed that the magnitude of the viscosity change would be much larger than in 0.1 N NaCl. Since PEZ 7 in salt-free water (FIG. 8) is the most expanded, hence more hydrated, a greater number of water molecules are released as a result of each protonation in salt-free water than in 0.1 N NaCl, thereby leading to an entropy-driven higher basicity constant and n in the former medium (Table 3). The basicity constant (log $K^0$) of the carboxyl group was found to be 3.42 and 2.98 in salt-free water and in 0.1 N NaCl, respectively. It should be understood that the carboxyl basicity constant (log $K^0$) in PEZ 7 is the $pK_a$ value for the corresponding conjugate acid PZA 6.

TABLE 4

Experimental Details for the Protonation of the Polymers PZA 6 ($ZH^±$) at 23° C. in Salt-Free Water and 0.1N NaCl

| Run | $ZH^±$ (mmol) | $CT^a$ (mol dm$^{-3}$) | α-range | pH-range | Points$^b$ | Log $K^{oc}$ | $n^c$ | $R^2$, $^d$ |
|---|---|---|---|---|---|---|---|---|
| Polymer in Salt-Free water$^e$ | | | | | | | | |
| 1 | 0.3536 | 0.09930 | 0.17-0.60 | 4.98-3.04 | 24 | 3.43 | 2.19 | 0.9988 |
| 2 | 0.2910 | 0.09930 | 0.17-0.53 | 5.01-3.27 | 22 | 3.46 | 2.24 | 0.9959 |
| 3 | 0.2352 | 0.09930 | 0.14-0.53 | 5.23-3.28 | 20 | 3.38 | 2.29 | 0.9960 |
| Average | | | | | | 3.42 (4) | 2.24 (5) | |

Log $K^f$ = 3.42 + 1.24 log[(1 − α)/α] For the reaction: $Z^{±-} + H^+ \rightleftharpoons ZH^±$

| Polymer in 0.1N NaCl | | | | | | | | |
|---|---|---|---|---|---|---|---|---|
| 1 | 0.2847 | 0.09930 | 0.20-0.51 | 3.74-2.95 | 23 | 2.95 | 1.21 | 0.9887 |
| 3 | 0.2302 | 0.09930 | 0.15-0.50 | 3.81-2.91 | 20 | 2.90 | 1.20 | 0.9962 |
| 2 | 0.1878 | 0.09930 | 014-0.52 | 4.11-3.05 | 22 | 3.08 | 1.27 | 0.9958 |
| Average | | | | | | 2.98 (9) | 1.23 (4) | |

Log $K^f$ = 2.98 + 0.23 log[(1 − α)/α] For the reaction: $Z^{±-} + H^+ \rightleftharpoons ZH^±$ $^a$Concentration of titrant HCl
$^b$Number of data points from titration curve.
$^c$Values in the parentheses are standard deviations in the last digit.
$^d$R = Correlation coefficient.
$^e$titration was carried out in the presence of 2.0-3.0 cm$^3$ of 0.1031N—added NaOH to attain the required values of α.
$^f$log $K_i$ = log $K^°$ + (n − 1) log [(1 − α)/α].

Figure 12:
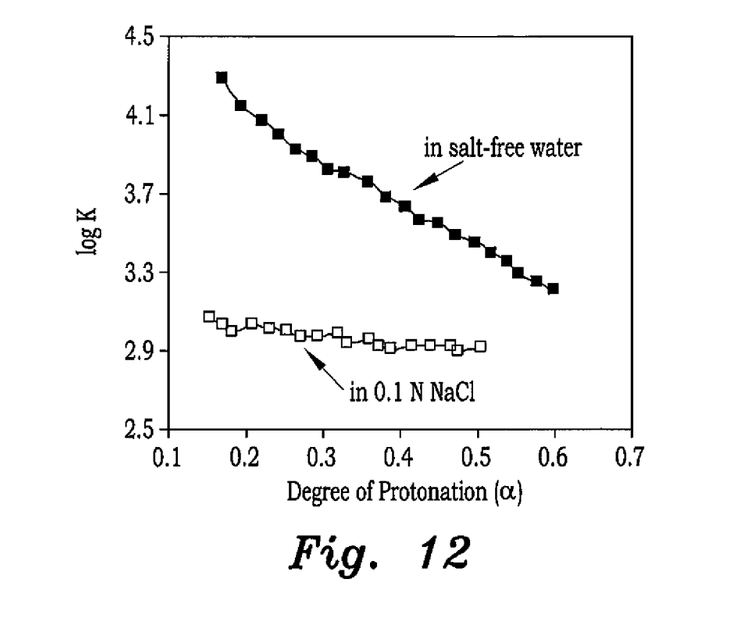
FIG. 12 is a graph showing the apparent log K versus degree of protonation (α) for compound 6 of the reaction scheme of FIG. 1 in salt-free water and in 0.1 N NaCl.

As shown in Table 4 and FIG. 12, an n value of >1 is associated with a decrease of the basicity constant (K) and the degree of protonation (a) of the $CO_2^-$ in PEZ 7, thus reflecting the "apparent" nature of K. The values of 2.24 and 1.27 in salt-free water and in 0.1 N NaCl, respectively, reflect a stronger polyelectrolyte effect in the former medium (Table 4). After each protonation, the anionic/zwitterionic motif (−±) in PEZ 7 is progressively transformed to electroneutral motif (±) in PEZ 6. The decrease in the overall negative charge density per each repeating unit in partially protonated (−±) PEZ 7 leads to a progressive decrease in the electrostatic field force that encourages protonation. It should be noted that the n value for the protonation of basic $CO_2^-$, which is in the α-position with respect to the positive nitrogens, as in 8 and 10, is found to be <1. The n value of <1 in 8 or 10 is diagnostic of a tightly compact zwitterionic (±) conformation, which uncoils during protonation (leading to cationic motifs), thereby allowing the protons to have easier access to the $CO_2^-$ anions with increase in the α. The log K of the $CO_2^-$ in an α-position with respect to the positive nitrogens in an anionic/zwitterionic motif was found to be >1.

Figure 13:
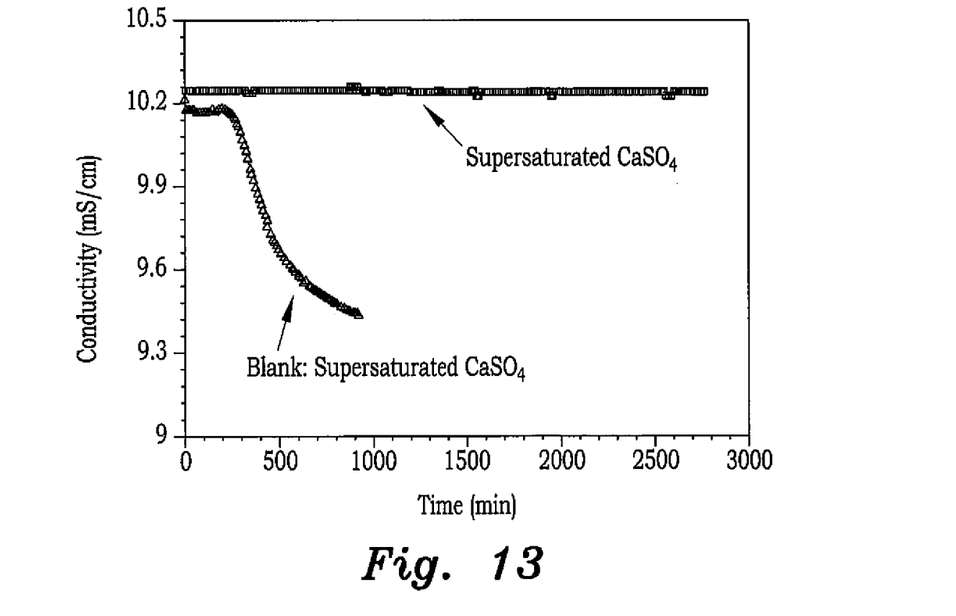
FIG. 13 is a graph showing the precipitation behavior of supersaturated solution of CaSO$_4$ in the presence (10 ppm) and absence of compound 6 of the reaction scheme of FIG. 1.

The neutralization process, which transforms the anionic motifs in (−±) PEZ 7 to zwitterionic motifs in (±) PZA 6, The precipitation behavior of a supersaturated solution of $CaSO_4$ containing 1300 ppm of $Ca^{2+}$ and 3150 ppm of $SO_4^{2-}$ was determined in the absence and presence of 10 ppm of PZA 6. Conductivity measurements were made at an interval of 10 min initially to quantify the effectiveness of the antiscalant, PZA 6. Induction time was measured when precipitation started, which is observed by drop in conductivity. No noticeable change in the conductivity was found for the duration of 2770 min (i.e., 46.2 h). The conductivity at zero and 2770 min were measured to be 10.25 mS/cm and 10.24 mS/cm, respectively, virtually assuring ~100% scale inhibition in the presence of 10 ppm of PZA 6 (FIG. 13). It should be noted that in the absence of antiscalant PZA 6, the precipitation started as indicated by the drop in conductivity (FIG. 13). The results indicate that the synthesized additive (PZA 6) is very effective against precipitation of gypsum at 40° C., and hence, is suitable for use in inhibiting calcium sulfate precipitation in desalination plants.

Polyzwitterions typically have collapsed or globular conformations in salt-free solution due to the intragroup, intra- and inter-chain electrostatic dipole-dipole attractions among the dipolar motifs. They exhibit "antipolyelectrolyte" effect, which is globule-to-coil transitions in the salt-added solutions, owing to the neutralization of the ionically cross-linked network in a collapsed coil conformation of the polymers. The polyzwitterions containing the permanent dipole may therefore be tailored for enhancement in solubility and viscosity in the presence of added salt, owing to the shielding of the coulombic (dipole-dipole) attractions. Because of their high dipole moment, polyzwitterions provide an excellent polar host matrix in which only target ions can migrate. The stoichiometric blend of some polyzwitterions with alkali metal salts produces excellent matrices having high ionic conductivity.

Polyzwitterions may be useful in a wide range of applications. The pH-responsive PZs, whose structure and behavior seem to mimic biopolymers, may be utilized for the development of anticarcinogenic drugs in combination with fullerenes, and for improvement of the biocompatibility of various medical and nanotechnology tools. The unique "antipolyelectrolyte" behavior makes polyzwitterions attractive candidates for application in enhanced oil recovery, drag reduction, personal care products, cosmetics, and pharmaceuticals. Other applications include fungicides, fire-resistant polymers, lubricating oil additives, emulsifying agents, and bioadherent coatings. Polyzwitterions may be utilized for efficient separations of biomolecules and to develop procedures for DNA assay. Polyzwitterions may also be used in the field of ion exchange. Further, based on their abilities to chelate toxic trace metals (Hg, Cd, Cu, and Ni), polyzwitterions may be used in wastewater treatment. PZs may also be used as drilling-mud additives, and for the separation of water and oil from water in-oil emulsions.

Details of the synthesis of the polymers shown in FIG. 1 are described in the examples described below. Elemental analysis was carried out on a Perkin Elmer Elemental Analyzer Series II Model 2400. IR spectra were recorded on a Perkin Elmer 16F PC FTIR spectrometer. The $^{13}$C and $^{1}$H NMR spectra of the polymers were measured in $D_2O$ (using HOD signal at 4.65 and dioxane $^{13}$C peak at 867.4 as internal standards) on a JEOL LA 500 MHz spectrometer. Viscosity measurements were made by Ubbelohde viscometer (having viscometer constant of 0.005718 cSt/s at all temperatures) using $CO_2$-free water under $N_2$ in order to prevent $CO_2$ absorption that may affect the viscosity data. For potentiometric titrations, the pH of the solutions was recorded using a Corning pH Meter 220. Molecular weights of some of the synthesized polymers were determined by GPC analysis using Viscotek GPCmax VE 2001. The system was calibrated with nine polyethylene oxide monodispersed standards at 30° C. using two Viscotek columns G5000 and G6000 in series.

2,2'-Azoisobutyronitrile (AIBN) from Fluka AG (Buchs, Switzerland) was purified by crystallization from a chloroform-ethanol mixture. Dimethylsulfoxide (DMSO) was dried over calcium hydride overnight and then distilled under reduced pressure at a boiling point of 64-65° C. (4 mmHg). For dialysis, a Spectra/Por membrane with a molecular weight cut-off (MWCO) value of 6000-8000 was purchased from Spectrum Laboratories, Inc. All glassware was cleaned with deionized water. All of the polymerizations were carried out under the conditions described in Table I.

Example 1

Synthesis of Zwitterionic Monomer 4

Zwitterionic monomer 4 was prepared in 82% yield by heating an equimolar mixture of N,N-diallyl-N-carboethoxymethylamine (2) and 1,3-propanesulfone (3) in acetonitrile (130 cm³ for 0.13 mol amine) at 72° C. for 72 h. Mp (methanol/acetone/diethyl ether) 162-163° C.

Example 2

Synthesis of PZ 5

Figure 4A:
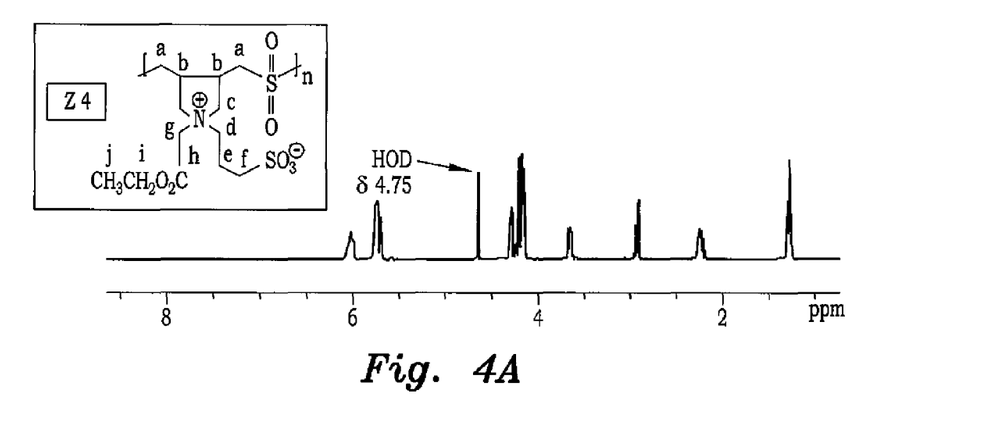
FIG. 4A is a $^1H$ NMR spectrum of compound 4 of the reaction scheme of FIG. 1.
Figure 4B:
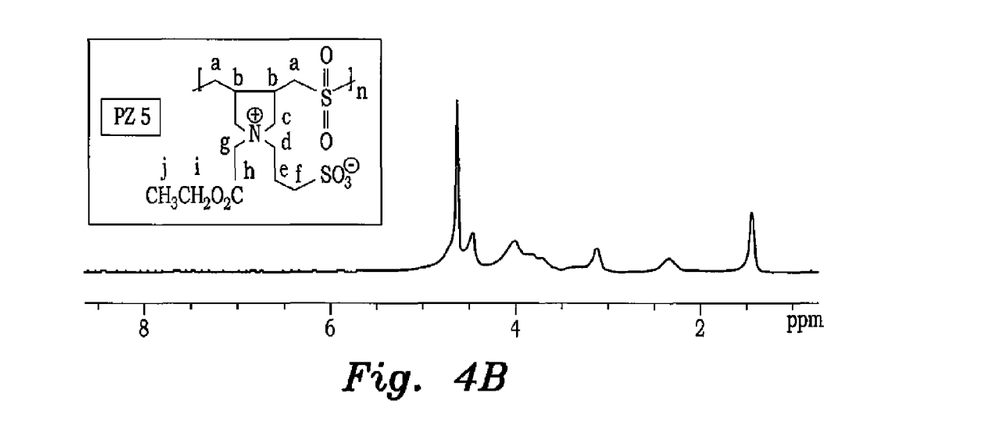
FIG. 4B is a $^1H$ NMR spectrum of compound 5 of the reaction scheme of FIG. 1.
Figure 5A:
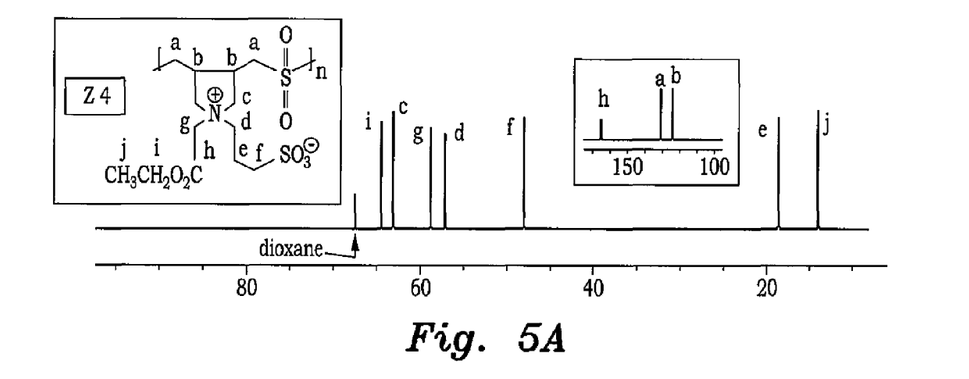
FIG. 5A is a $^{13}C$ NMR spectrum of compound 4 of the reaction scheme of FIG. 1.
Figure 5B:
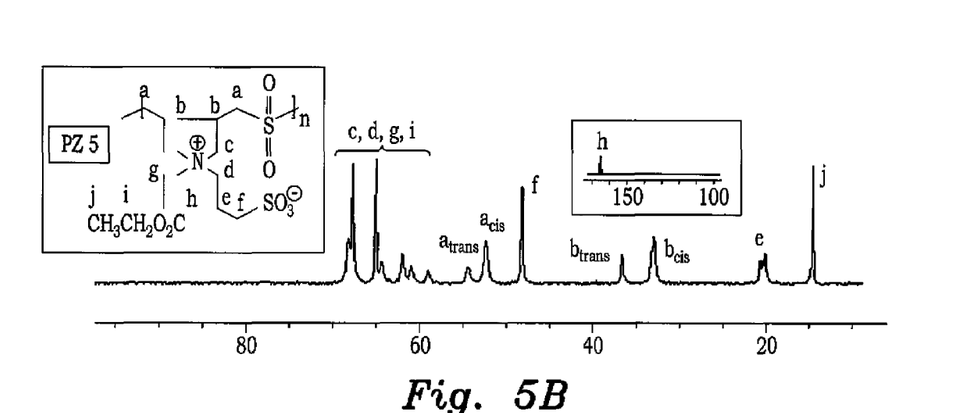
FIG. 5B is a $^{13}$C NMR spectrum of compound 5 of the reaction scheme of FIG. 1.

In a typical experiment, $SO_2$ (20 mmol) was absorbed in a solution of monomer 4 (20 mmol) in DMSO (5.8 g). The required amount of the initiator (AIBN) (60 mg) was then added under $N_2$, and the closed flask was stirred using magnetic stir-bar at 60° C. for 24 h. Within 2 h, the magnetic bar stopped stirring, and the initial reaction mixture became a solid mass of white polymer. At the end of the elapsed time, the hard polymeric mass was crushed to powder, soaked in methanol, filtered, and washed with a Jiberal excess of hot (50° C.) methanol to ensure the complete removal of the unreacted monomer (as indicated by $^{1}$H NMR). PZ 5 was then dried under vacuum at 60° C. to a constant weight. The onset of thermal decomposition (closed capillary): the color changed to brown at 255° C. and turned to black at 270° C. (Found: C, 42.0; H, 6.5; N, 3.7; S, 16.9%. $C_{13}H_{23}NO_7S_2$ requires C, 42.26; H, 6.27; N, 3.79; S, 17.36%); $\nu_{max}$ (KBr): 3755, 3441, 2983, 1744, 1646, 1471, 1417, 1311, 1216, 1127, 1037, 909, 860, 729, 602 cm$^{-1}$. $^{1}$H and $^{13}$C NMR spectra of PZ 5 are shown in FIGS. 4B and 5B, respectively.

For the determination of molecular weights, PZ 5 was analyzed using an aqueous solution of 0.5 N NaCl as the eluent. Refractive Index and viscometer detectors were used to detect polymers. The molecular weight ($\overline{M}_W$) and PDI of some of the polymers are given in Table 1.

Example 3

Synthesis of PZA 6

PZ 5 (3.0 g, 8.12 mmol) (entry 4, Table 1) was hydrolyzed in 6M HCl (60 mL) at 53° C. for 48 h. The homogeneous mixture was cooled to room temperature and dialyzed against deionized water (to remove HCl) for 24 h. During dialysis, precipitation of the polymer occurred immediately, and its amount increased with time. The resulting mixture containing the solid was freeze-dried to obtain PZA 6 as a white solid (2.36 g, 92%). The polymer was found to be insoluble in water, but soluble in the presence of HCl. The onset of thermal decomposition (closed capillary): the color changed to dark brown at 275° C. and to black at 285° C.; (Found: C, 38.4; H, 5.8; N, 3.9; S, 18.5%. $C_{11}H_{19}NO_7S_2$ requires C, 38.70; H, 5.61; N, 4.10; S, 18.78%); $\nu_{max}$ (KBr): 3620, 3451, 2973, 2930, 2372, 1741, 1643, 1461, 1423, 1310, 1213, 1129, 1034, 700, 729, 578 cm$^{-1}$.

Figure 4C:
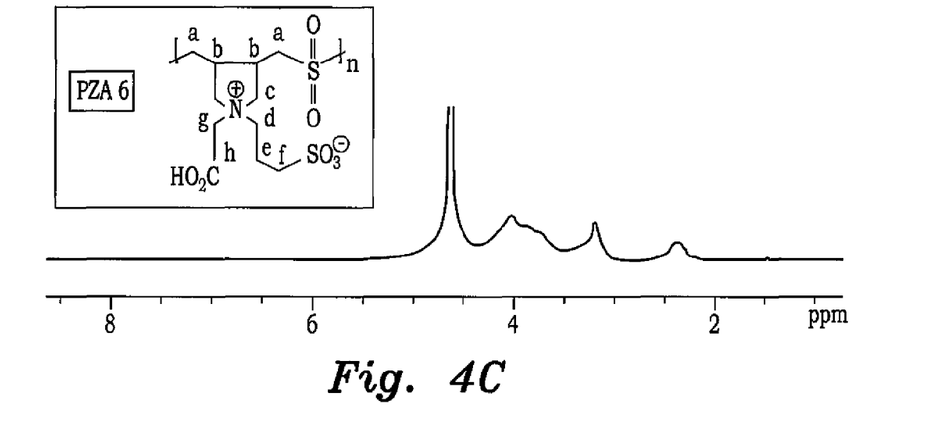
FIG. 4C is a $^1H$ NMR spectrum of compound 6 of the reaction scheme of FIG. 1.
Figure 5C:
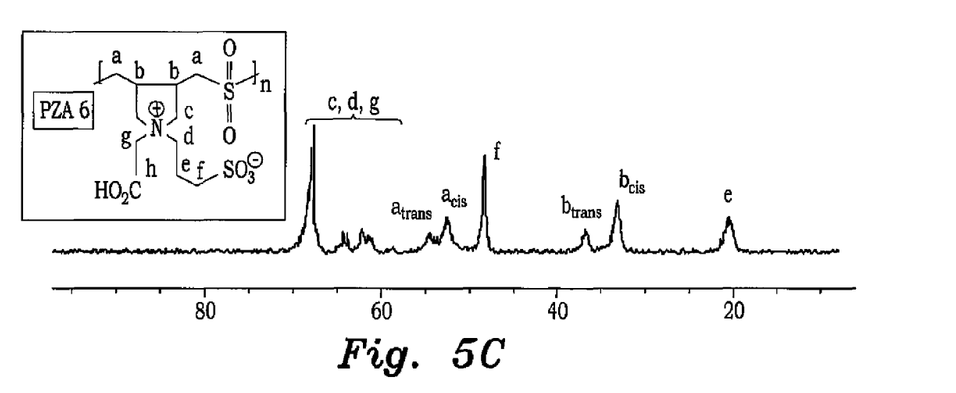
FIG. 5C is a $^{13}$C NMR spectrum of compound 6 of the reaction scheme of FIG. 1.

The $^{1}$H and $^{13}$C NMR spectra of PZA 6 are shown in FIGS. 4C and 5C, respectively.

Example 4

Synthesis of PEZ 7

To a sample of PZA 6 (derived from entry 4, Table 1) (0.688 g, 2.02 mmol) was added NaOH (0.163 g, 4.1 mmol) in 2.5 cm³ deionized water. After stirring for 5 min, PEZ 7 was precipitated in methanol. Filtration and washing with excess methanol gave the white polymer 7, which was dried under vacuum at 55° C. to a constant weight (0.68 g, 93%).

The onset of thermal decomposition (closed capillary): the color changed to brown at 280° C. and black at 305° C. (Found: C, 36.1; H, 5.2; N, 3.7; S, 17.4%. $C_{11}H_{18}NNaO_7S_2$ requires C, 36.36; H, 4.99; N, 3.85; S, 17.65%); $v_{max}$ (KBr): 3446, 3031, 2970, 2921, 1628, 1460, 1405, 1304, 1204, 1131, 1044, 913, 731 $cm^{-1}$.

Figure 4D:
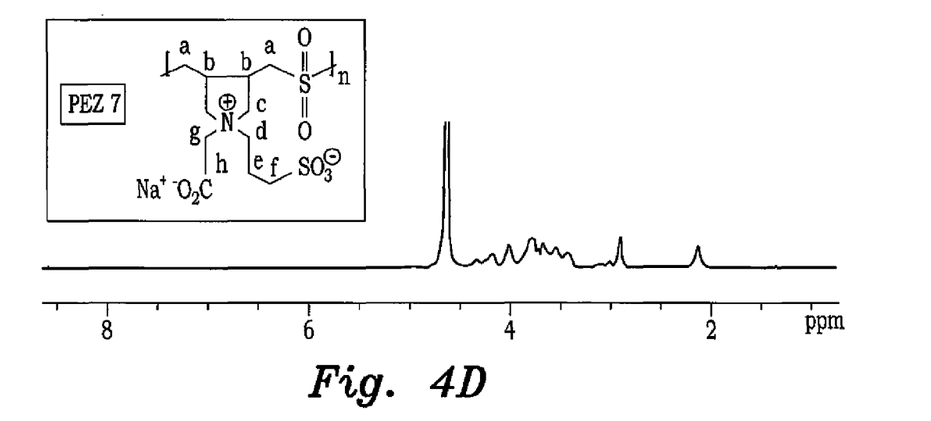
FIG. 4D is a $^1H$ NMR spectrum of compound 7 of the reaction scheme of FIG. 1.
Figure 5D:
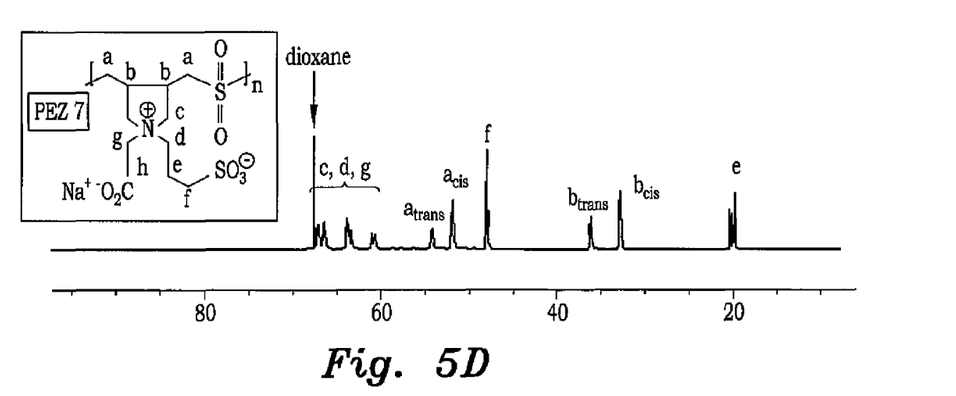
FIG. 5D is a $^{13}$C NMR spectrum of compound 7 of the reaction scheme of FIG. 1.

The $^1H$ and $^{13}C$ NMR spectra of PEZ 7 are shown FIGS. 4D and 5D, respectively.

Example 5

Solubility Measurements and Cloud Point Titration

A 1% (w/w) mixture of PZ 5, PZA 6, and PEZ 7 in a solvent was heated to 70° C. for 1 h and then cooled to 23° C. The results of the solubility are shown in Table 2. The minimum salt concentration (CSC) required to promote water solubility of PZ 5 (entry 4, Table 1) at 23° C. was measured by titration of a 1% w/w polymer solution at sufficiently high salt concentration with deionized water. The accuracy of the CSC values, obtained by visual determination of the first cloud point, was approximately ±2%. The CSC values are reported in Table 3.

The potentiometric titrations were carried out as described elsewhere using a solution of certain mmols of PZA 6 in 200 $cm^3$ of salt-free water or 0.1 N NaCl. The experimental details for the protonation of PZA 6 are shown in Table 4. The Log K of the carboxyl group is calculated at each pH value by the Henderson-Hasselbalch equation (Equation 2, provided below) where degree of protonation α is the ratio $[ZH^\pm]_{eq}/[Z]_o$, $[Z]_o$ is the initial concentration of repeating units in PZA 6, and $[ZH^\pm]_{eq}$ is the concentration of the protonated species at equilibrium.

$$pH = \log K^0 \pm n \log [(1-\alpha)/\alpha] \quad (2)$$

The titration with HCl was carried out in the presence of 1.5-2.5 $cm^3$ of 0.1036 N NaOH to attain the required values of α. In this case, $[ZH^\pm]_{eq}=[Z]_o+C_{H+}-C_{OH^-}-[H^+]+[OH^-]$, where $C_{H+}$ and $C_{OH^-}$ are the concentration of the added HCl and NaOH, respectively; $[H^+]$ and $[OH^-]$ at equilibrium were calculated from the pH value. The polyelectrolytes having apparent basicity constants could be described by Equation 3 (shown below), where log $K^0$=pH at α=0.5 and n=1 in the case of sharp basicity constants.

$$\log K = \log K^0 + (n-1)\log [(1-\alpha)/\alpha] \quad (3)$$

The linear regression fit of pH vs. log $[(1-\alpha)/\alpha]$ gave log $K^0$ and 'n' as the intercept and slope, respectively. Simultaneous protonation of the two basic sites ($CO_2^-$ and $SO_3^-$) is least likely, since the basicity constant for the $SO_3^-$ group (log K: ~−2.1) is less than that of the $CO_2^-$ (log K: ~+3) group by almost 5 orders of magnitude.

Example 6

Evaluation of Antiscalant Behavior

The brine concentrations and temperatures encountered in a Reverse Osmosis (RO) desalination process were considered to study the precipitation and inhibition of calcium sulfate (gypsum) using PZA 6. A typical analysis of brackish water and reject brine from the RO plant at King Fand University of Petroleum & Minerals (KFUPM), Dhahran, Saudi Arabia has been previously reported. The concentration of reject brine (i.e., concentrated brine) at 70% recovery was denoted as 1 CB. Analysis of brine in the RO Plant at KFUPM revealed the concentration of $Ca^{2+}$ in the brackish feed water and in the reject brine as 281.2 and 866.7 ppm respectively, while the corresponding concentration of $SO_4^{2-}$ was 611 and 2,100 ppm, respectively.

Solutions containing $Ca^{2+}$ and $SO_4^{2-}$ ions equal to 3 times the concentrated brine (CB) were prepared by dissolving the calculated amount of $CaCl_2$ and $Na_2SO_4$, respectively, in deionized water. A solution of 3 CB calcium chloride (60 mL) containing PZA 6 (20 ppm) was taken in a round bottom flask and heated to 40° C.±1° C. A preheated (40° C.) solution of 3 CB sodium sulfate (60 mL) was added quickly to the flask, the content of which was stirred at 300 rpm using a magnetic stir-bar. The resultant solution containing 10 ppm of PZA 6 becomes 1.5 CB, which is 1.5×866.7 mg/L, i.e., 1300 mg/L in $Ca^{2+}$ and 1.5×2100 mg/L, i.e., 3150 mg/L in $SO_4^{2-}$. Solubility data of $CaSO_4$ reveals that a 1.5 CB solution is supersaturated with respect to $CaSO_4$.

Conductivity measurements were made at an interval of every 10 min initially to quantify the effectiveness of newly developed antiscalant PZA 6. A drop in conductivity indicates the precipitation of $CaSO_4$. In the presence of PZA 6, no noticeable change in conductivity was found for the duration of 2770 minutes. Induction time was measured with a decrease in conductivity when precipitation started. Visual inspection was carefully done to determine whether any turbidity arose from precipitation.

It is to be understood that the present invention is not limited to the embodiments described above, but encompasses any and all embodiments within the scope of the following claims.

We claim:

1. A poly(zwitterion-alt-sulfur dioxide) copolymer having the structural formula:

or a salt thereof, wherein "n" is the number of repeating units.

2. The poly(zwitterion-alt-sulfur dioxide) copolymer according to claim 1, wherein n is greater than 10.

3. The poly(zwitterion-alt-sulfur dioxide) copolymer according to claim 1, wherein n is 15-200.

* * * * *